Oct. 8, 1968  R. E. HARRIS ETAL  3,404,809
LIQUID DISPENSING APPARATUS
Filed Aug. 3, 1966  3 Sheets-Sheet 1

INVENTORS
ROBERT E. HARRIS
HOWARD E. JOHNSON

BY
*McCormick, Paulding & Huber*
ATTORNEYS

Oct. 8, 1968 R. E. HARRIS ETAL 3,404,809
LIQUID DISPENSING APPARATUS
Filed Aug. 3, 1966 3 Sheets-Sheet 2

INVENTORS
ROBERT E. HARRIS
HOWARD E. JOHNSON

ATTORNEYS

Oct. 8, 1968    R. E. HARRIS ETAL    3,404,809
LIQUID DISPENSING APPARATUS
Filed Aug. 3, 1966    3 Sheets-Sheet 3
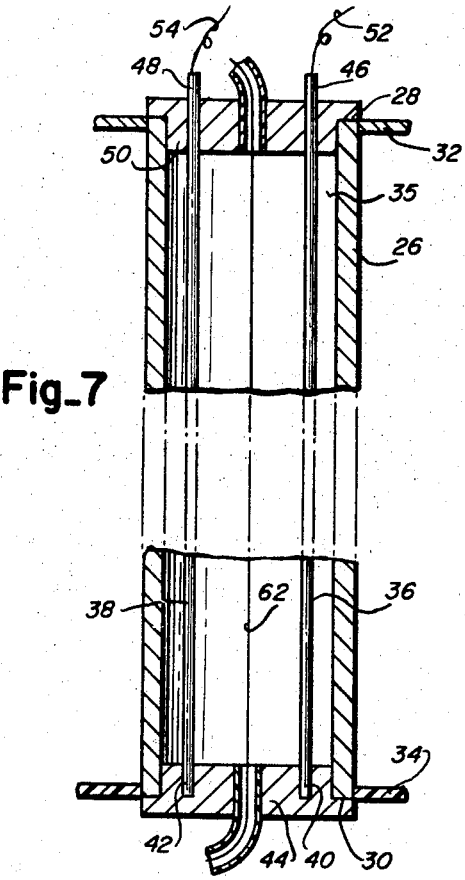
Fig_7
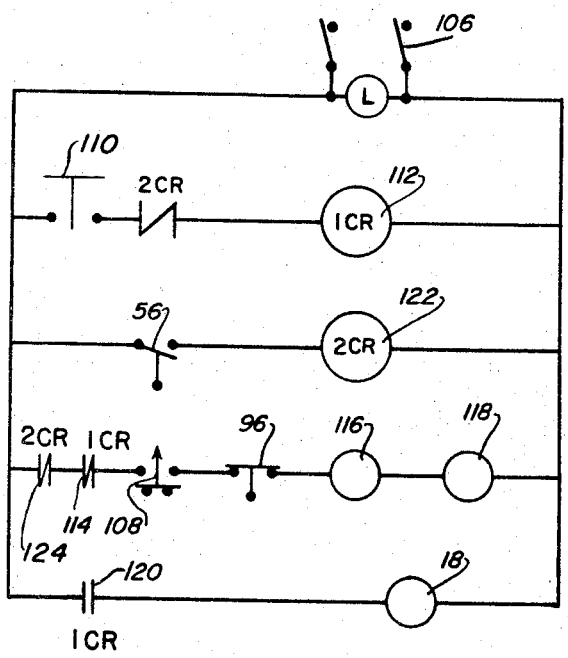
Fig_8
INVENTORS
ROBERT E. HARRIS
HOWARD E. JOHNSON
ATTORNEYS United States Patent Office 3,404,809
Patented Oct. 8, 1968

3,404,809
LIQUID DISPENSING APPARATUS
Robert E. Harris, 4 Saw Mill Lane, Avon, Conn. 06001,
and Howard E. Johnson, Pepper Ridge Road, Portland,
Conn. 06480
Filed Aug. 3, 1966, Ser. No. 570,048
6 Claims. (Cl. 222—17)

ABSTRACT OF THE DISCLOSURE

This invention comprises a liquid dispensing apparatus having a compartment for holding liquid, evacuation means associated with the compartment and actuating means to effect operation of the evacuation means to dispense a measured quantity of liquid from the compartment. The actuating means includes a pair of rigid, vertically arranged conductors mounted within a vertically oriented tube within the compartment to space the conductors from the liquid therein and a first switch slidably supported upon and guided by the conductors for vertical adjustment thereon, operatively associated with the evacuation means to regulate the quantity of liquid to be dispensed from the compartment. Switch actuating magnets carried by a float surround the tube and actuate the switch responsive to the level of liquid within the compartment.

---

This invention relates to a liquid dispensing apparatus and more particularly to a device for repeatedly dispensing accurately measured quantities of a liquid from a chamber therein.

It is the object of the present invention to provide a dispensing device which is semi-automatic in operation and which dispenses accurately measured quantities of a liquid from a dispensing chamber therein to a remote location; which is easily and rapidly adjusted as may be required to vary the quantity of the liquid dispensed; which dispenses liquid by volume regardless of viscosity; which is unaffected by varying head pressures; which is inexpensive to manufacture, easily maintained and durable and dependable in operation.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

In the drawing:

FIG. 7 is a fragmentary view, partially in section, showing details of the upper and lower ends of the tube housing the conductor.

FIG. 8 is one form of circuit diagram which may be used with the present invention.

Figure 1:
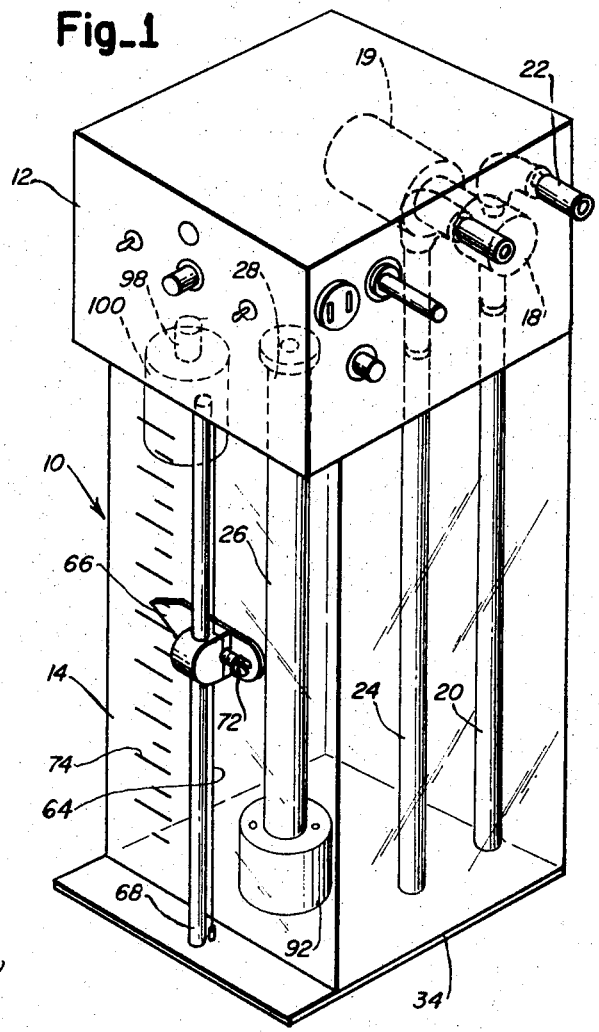
FIG. 1 is a perspective view showing a liquid dispensing apparatus constructed in accordance with the present invention.

Referring to the drawing, FIG. 1 shows a liquid dispenser 10 comprising an upper chamber 12 and an enclosed lower reservoir or liquid dispensing compartment 14. Preferably the dispensing compartment 14 is formed with transparent side walls 16, 16 to provide the added convenience of enabling the operator to observe visually the quantity of fluid therein.

The upper chamber 12 essentially serves to house the instrumentation required to fill and to empty the dispensing compartment. However, it may, when suitably associated with the dispensing compartment, be located remotely therefrom; but, for convenience and compactness it is preferably located as shown. A driven discharge pump 18 and driving motor 19 therefor, schematically illustrated in broken lines in the drawing, are suitably mounted within the upper portion 12. The pump 18 is connected with a discharge pipe 20 having one end thereof extending into the dispensing compartment 14 as shown and the other end connected to the discharge pump 19 to permit liquid from within the dispensing compartment to be pumped to a remote location through a discharge conduit 22. A supply conduit 24 is provided having its free end extending into the closed dispensing compartment, as illustrated, to permit filling said compartment 14 from a remote supply or reservoir, as required, by utilizing a conventional, driven pump or the like (not shown) suitably associated with the supply conduit 24.

A vertically disposed tube 26 is arranged within the dispensing compartment 14 with its upper and lower free ends 28 and 30, respectively, opening outwardly thereof through aligned apertures in the top 32 and the bottom 34 of said compartment, said apertures being suitably sealed to prevent leakage of liquid from the dispensing compartment. The tube 26 provides a vertical chamber or conduit 35 within which a pair of spaced, parallel electrodes or conductors 36, 38 are mounted parallel with the longitudinal axis of the tube. The conductors preferably comprise substantially rigid rods having their lower ends 40, 42 secured within a plug 44 which acts to close the lower end of the tube 26 and also to maintain the conductors in a fixed, spaced apart, parallel relationship. The upper ends 46, 48 of the rods 36, 38 extend through an upper plug 50 as can be best seen in FIG. 7. The upper ends 46, 48 extend outwardly of the plug 50 sufficiently to permit a suitable connection therebetween with leads 52 and 54, respectively, whereby the conductors 36 and 38 may be connected to a suitable source of electric energy in a conventional manner. It will be understood by those having ordinary knowledge of the art that the lower plug 44 and upper plug 50 which function both to hold the conductors within the tube 26 and to retain them in spaced apart parallel relationship are obviously made of a non-conductive material.

A reed switch 56 is positioned within the tube 26 between the conductors 36 and 38 for selective vertical positioning within the chamber 35. The switch 56 is connected to the conductors 38 and 36 by upper and lower terminals 58 and 60 respectively. The terminals 58 and 60 are of electrically conductive material and are arranged and constructed to permit sliding movement thereof upon the conductors 38 and 36, respectively.

Figure 2:
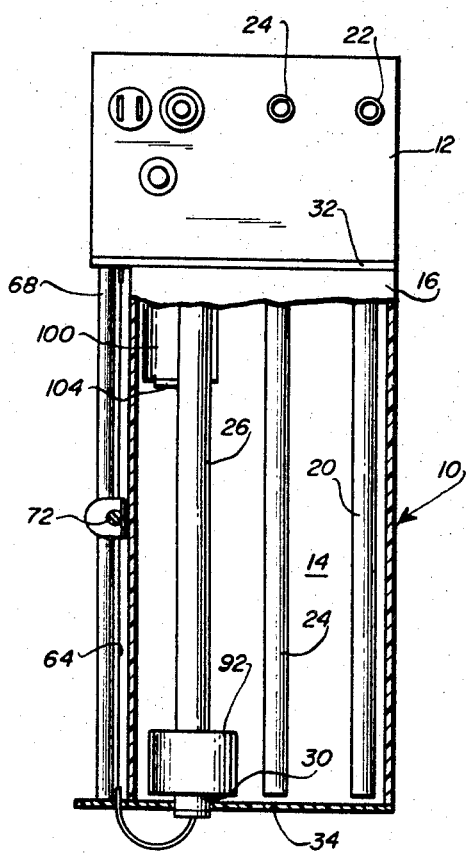
FIG. 2 is an elevational side view thereof shown partially in section.
Figure 6:
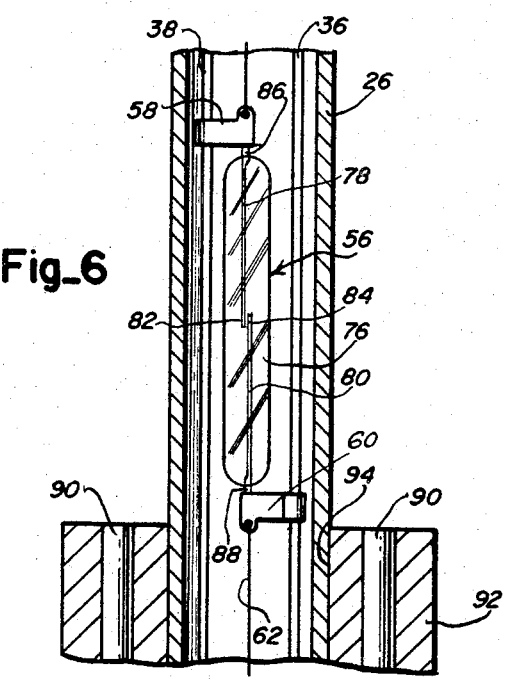
FIG. 6 is a fragmentary sectional view enlarged to show the details of the adjustably positionable reed switch arranged within the tube.

As can be seen from FIGS. 2 and 6, the free ends of a cord 62 extend into the tube 26 through the upper and lower ends thereof and are secured to the upper and lower terminals of the switch 56 with an intermediate or loop portion 64 of the cord arranged outwardly of the compartment 14, adjacent to the front side wall thereof. It is apparent that the switch 56 can be selectively, vertically positioned within the chamber 35 of the tube 26 by drawing the intermediate portion 64 of the cord 62 either upwardly or downwardly causing the attached switch to move in response thereto guiding on the conductors 38 and 36 for such movement. An indicator 66 is frictionally secured to a post 68 for vertical sliding adjustment thereupon. The post 68 is mounted adjacent to the outer surface of the front side wall of the dispenser to extend between the top 32 and bottom 34 of the dispensing compartment, with its axis vertical and parallel with the axis of the tube 26.

The intermediate portion 64 of the cord may be adjustably attached to the indicator 66, by any suitable means, for movement therewith. For purposes of illustration, the portion 64 of the cord 62 is shown disposed within a groove 70 formed in the indicator and releasably retained therein by a set screw 72 securing the cord to the indicator. It can be seen that by loosening the set screw, the indicator may be moved relative to the cord for calibrating the indicator and switch 56 with associated indicia 74 provided on the wall of dispensing compartment adjacent to the indicator.

With the cord secured to the indicator it is obvious that movement of the indicator vertically on the post 68 will cause vertical movement of the switch 56 within the chamber 35 of the tube 26. However, the movement of the switch will be opposite that of the indicator. In other words, when the indicator is moved vertically upwardly, the switch will be moved vertically downwardly.

The magnetic reed switch 56 is of a conventional, normally open type and comprises an elongated hermetically sealed glass capsule 76 containing two, longitudinally extending reeds 78, 80. The interior ends 82, 84 thereof overlap in normally spaced apart relationship while the opposite or outer ends 86, 88 thereof extend outwardly of the capsule permitting connection with the upper and lower terminals 58 and 60 as shown. The reeds are made of a magnetically "soft" alloy that retains only a little magnetism, and hence, the switch may be actuated to close a circuit by moving a magnet into close proximity thereto. As a magnet moves closer to the reeds, it reaches a point where its field lines tend to permeate the reeds because of their lower magnetic reluctance in comparison to air, and the mutual attraction between the reeds pulls the overlapping ends together to close an electric circuit. A reverse action takes place when a magnet is moved away from the switch. The influence of the magnetic field of the receding magnet is insufficient to hold the reeds together and, therefore, their overlapping ends separate.

In the present invention a pair of magnets 90 imbedded in a cylindrical float 92 is provided to actuate the reed switch 56. The magnets lie on opposite sides of a central opening 94 extending through the float. The opening 94 is arranged to receive the tube 26 therethrough whereby the float may guide upon the tube for vertical movement within the dispensing compartment, responsive to changes in the liquid level thereof.

The float 92 is preferably made of a non-absorbent material which will float upon the surface of a liquid within the dispensing compartment, which will be chemically unaffected thereby, and which will have sufficient mass and buoyancy to support the imbedded magnets 90.

Figure 3:
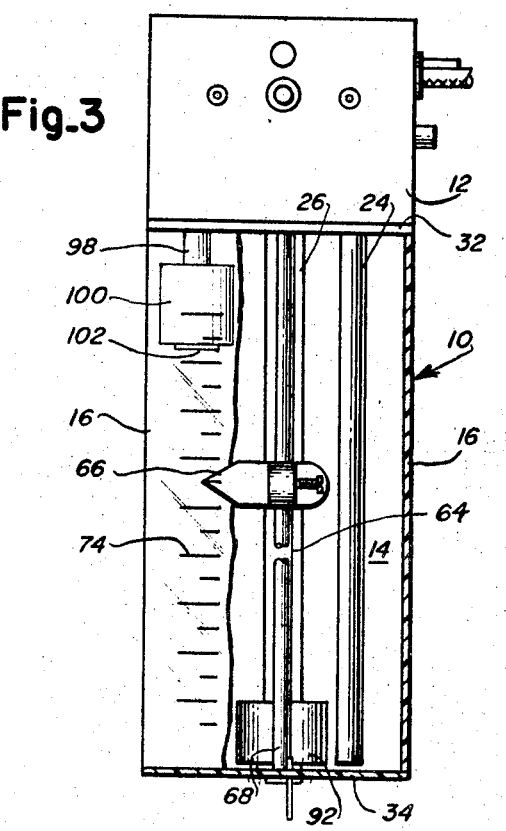
FIG. 3 is an elevational front view of said invention also shown partially in section.
Figure 4:
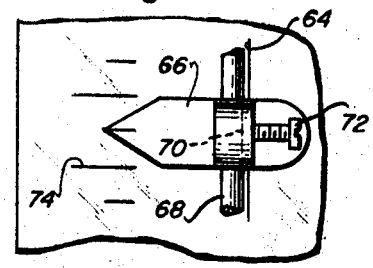
FIG. 4 is an enlarged, fragmentary elevational front view showing the adjustable indicator and associated indicia used to position the switch means associated with the dispensing mechanism of the dispenser.
Figure 5:
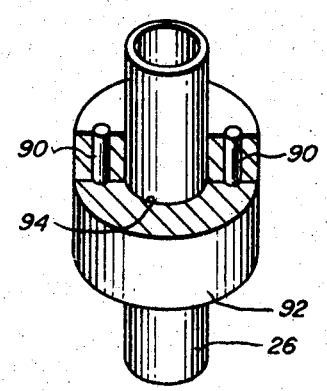
FIG. 5 is an enlarged fragmentary view, partially in section, of the float and embedded magnets, shown in operative position on the tube containing the adjustably positionable reed switch.

A second, normally open, reed switch 96 is encapsuled within a vertical depending tube 98 secured at its upper end to the top 32 of the dispensing compartment to depend downwardly therefrom as best shown in FIG. 3. A second float 100, substantially identical in construction to the float 92 and also containing embedded magnets, is slidably arranged upon the depending tube 98 for limited vertical movement thereupon responsive to changes in the level of the liquid in the upper portion of the dispensing compartment. The lower end of the depending tube 98 is sealed by an insert 102 formed with an extending, circumferential flange 104 upon which the float 100 rests when the liquid level in the compartment falls below the said flange.

The encapsuled, non-adjustable, reed switch 96 is arranged in the tube 98 whereby its reeds will be acted upon by the magnets carried within the float 100 to close the switch when the float 100 rests upon the flange 104. The reeds will return to their normally open, spaced apart position when the float 100 is caused to rise vertically upon the tube 98 responsive to a rising liquid level in the dispensing compartment, removing the influence of the embedded magnets upon the overlapping ends of the reeds. The switch 96 is operatively associated, by conventional circuitry, to energize and de-energize a remote pump (not shown) which acts to fill the dispensing compartment with a liquid from a remote source.

It is to be understood that suitable circuitry is provided for association with both reed switches 56 and 96 for selectively energizing both the fill and the discharge motors and pumps. For purposes of illustration only, the circuit diagram shown in FIG. 7 of the drawing will be described; however, it will be understood that other circuit arrangements may likewise be used with satisfactory results.

In operation, when it is desired to dispense a measured quantity of a liquid, as for example an admixture to supplement the water commonly used with cement by mixing plants in making concrete, the operator initially positions the indicator 66 vertically on the post 68 as indicated by the indicia 74 adjacent to the quantity of liquid required. As the indicator 66 is operatively associated with the adjustable reed switch 56 by the cord 62 as described, vertical movement of the indicator causes a similar, but opposite, vertical movement of the switch 56 within the tube 26.

Positioning the on-off switch 106 in the "on" position and the auto-manual selector switch 108 in the "auto" position permits electrical energy to flow across normally closed contacts 114 and 124 through the closed auto-manual selector switch 108, and closed reed switch 96, to energize the motor relay 116 whereby the remote fill pump 118 will pump liquid into the dispensing compartment through supply conduit 24. When the rising liquid level in the dispensing compartment causes the second float 100 to rise, the magnets carried by the float are lifted to a predetermined point above the stationary reed switch 96 where their influence upon the reeds no longer acts to hold the switch 96 closed. The overlapping ends of the reeds spring apart, breaking the circuit and interrupting the flow of electrical current to shut off the fill pump 118 whereby the liquid level in the dispensing compartment is at a predetermined point relative to the indicia 74.

To dispense the desired quantity of liquid as indicated on the indicia opposite the indicator, the discharge pump 18 is energized by depressing the start switch 110, energizing relay 112, opening contacts 114, and closing contacts 120 permitting discharge pump 18 to dispense liquid from the compartment 14 through discharge conduit 20 and line 22. As the liquid is pumped from the compartment, the float 92 falls with the level of the liquid within the compartment until the field of the magnets 90 carried by the float acts upon the normally opened reed switch 56 to bring the overlapping ends of its reeds together closing the switch, energizing relay 122, which when energized trips out relay 112, opening contacts 120, stopping the action of pump 18 and any further discharge of liquid from compartment 14. It is understood that relay 112 is arranged in a conventional manner to be electrically interlocked to remain energized when the start switch 110 is depressed and is de-energized or tripped out when relay 122 is energized.

The conventional auto-manual switch 108 is optional and is shown as included in the circuitry to permit automatic refilling of the dispensing compartment after dispensing the desired quantity of liquid therefrom, as the normally closed contacts 124 (opened only when relay 112 is energized) complete the circuit through reed switch 96, closed as previously explained when the liquid level in the dispensing compartment falls, thus permitting the pump 118 to refill compartment 14 as aforesaid.

The invention claimed is:

1. A liquid dispensing apparatus including a compartment for holding a quantity of liquid, a discharge conduit opening at one end within said compartment and at the other end outwardly thereof to discharge liquid therefrom, evacuation means associated with the discharge conduit to evacuate a measured quantity of liquid from said compartment, and means for actuating said evacuation means comprising a pair of vertically oriented, spaced, elongated conductors extending for substantially the height of said compartment and spaced from the liquid therein, a first switch supported upon said conductors for selective sliding adjustment thereon irrespective of the level of the liquid therein which when closed will complete an electric circuit across said conductors, said conductors being substantially rigid and functioning to guide and to support said switch as it is adjusted vertically thereupon, adjusting means for adjusting the switch vertically relative to the height of the compartment, said adjusting means including a movable indicator operatively associated with said switch to cause vertical movement thereof responsive to movement of said indicator, and switch actuating means for opening and closing the switch responsive to the level to the liquid within the compartment.

2. A liquid dispensing apparatus as set forth in claim 1 wherein the switch actuating means comprises a float operatively associated with said switch and adapted to float upon the surface of the liquid within the compartment, said float containing a magnet whose magnetic field will act to close the switch when the magnet is substantially adjacent thereto.

3. A liquid dispensing apparatus as set forth in claim 1 wherein the said switch is supported between the said conductors, by upper and lower terminals, said terminals being slidably secured to said conductors permitting selective positioning of said switch therealong, said adjusting means including a flexible cord secured to said upper and lower terminals and to said movable indicator for movement therewith.

4. A liquid dispensing apparatus as set forth in claim 1 including a vertically oriented tube associated with said compartment, said tube containing the said conductors and said adjustable switch, said conductors being arranged therein substantially parallel with the longitudinal axis thereof.

5. A liquid dispensing apparatus as set forth in claim 4 wherein the said tube is disposed within the said compartment and including means for adjusting said switch vertically within said tube relative to the height of said compartment, said adjusting means including a movable indicator operatively associated with said switch whereby vertical movement of the switch within said tube may be effected by movement of said indicator.

6. A liquid dispensing apparatus as set forth in claim 1 including a supply conduit communicating with said compartment, supply means including a fill pump operative to introduce liquid into said compartment through said supply conduit and a second switch operatively associated with said evacuation means and said supply means, said second switch acting to energize said fill pump, and actuating means responsive to the level of the liquid within the compartment for opening and closing said second switch, said first and second switches being operatively associated to prevent simultaneous operation of said evacuation and supply means.

References Cited

UNITED STATES PATENTS

| | | | |
|---|---|---|---|
| 867,094 | 9/1907 | Beman | 222—158 |
| 1,231,006 | 6/1917 | Flint | 222—64 X |
| 2,243,188 | 5/1941 | Biach. | |
| 3,114,478 | 12/1963 | Hilkemeier | 222—17 |
| 3,224,638 | 12/1965 | Harrell | 222—76 |
| 2,524,261 | 10/1950 | Kaminky | 335—205 X |
| 2,898,422 | 8/1959 | Peek | 335—84 X |

FOREIGN PATENTS 600,834  11/1924  France.

ROBERT B. REEVES, *Primary Examiner.*